(12) United States Patent
Anderson

(10) Patent No.: US 8,154,885 B2
(45) Date of Patent: Apr. 10, 2012

(54) DISPLAY MOUNTING SYSTEM

(75) Inventor: Donald Lee Anderson, Oak Park, IL (US)

(73) Assignee: Peerless Industries, Inc., Aurora, IL (US)

( * ) Notice: Subject to any disclaimer, the term of this patent is extended or adjusted under 35 U.S.C. 154(b) by 453 days.

(21) Appl. No.: 12/415,678

(22) Filed: Mar. 31, 2009

(65) Prior Publication Data

US 2009/0251880 A1  Oct. 8, 2009

Related U.S. Application Data

(60) Provisional application No. 61/041,826, filed on Apr. 2, 2008.

(51) Int. Cl.
*H02B 1/01* (2006.01)
(52) U.S. Cl. .................................. 361/825; 248/917
(58) Field of Classification Search ............... 361/825; 248/924, 917, 919, 920, 922, 157, 161
See application file for complete search history.

(56) References Cited

U.S. PATENT DOCUMENTS

| | | | | |
|---|---|---|---|---|
| 4,840,339 A * | 6/1989 | Grogan | ....................... | 248/205.2 |
| 4,863,127 A * | 9/1989 | Handler | ....................... | 248/205.2 |
| 4,870,725 A * | 10/1989 | Dubowik | ....................... | 24/442 |
| 4,879,854 A * | 11/1989 | Handler | ....................... | 52/238.1 |
| 4,981,243 A | 1/1991 | Rogowski | | |
| 6,012,694 A * | 1/2000 | Sullivan, III | ................. | 248/323 |
| 6,104,424 A * | 8/2000 | McNelley | ................... | 348/14.16 |
| 6,125,030 A * | 9/2000 | Mola et al. | ............... | 361/679.56 |
| 6,870,670 B2 | 3/2005 | Gehring et al. | | |
| 6,923,413 B2 * | 8/2005 | Dozier | ....................... | 248/294.1 |
| 7,070,156 B2 * | 7/2006 | Liao | ............................ | 248/466 |
| D558,036 S * | 12/2007 | Rogers | ....................... | D8/380 |
| D563,962 S * | 3/2008 | Grey | ............................. | D14/452 |
| 7,361,046 B2 * | 4/2008 | Drew | ............................ | 439/353 |
| D593,080 S * | 5/2009 | Russell et al. | ............... | D14/239 |
| 7,712,717 B2 * | 5/2010 | Burns | ........................ | 248/291.1 |
| 7,722,002 B2 * | 5/2010 | O'Keene et al. | ........... | 248/274.1 |
| 7,891,622 B1 * | 2/2011 | O'Keene | .................. | 248/292.13 |
| 2001/0040560 A1 * | 11/2001 | Amron | ........................... | 345/169 |
| 2002/0163722 A1 | 11/2002 | Gehring et al. | | |
| 2003/0201372 A1 * | 10/2003 | Dozier | ........................ | 248/286.1 |
| 2007/0258196 A1 | 11/2007 | Koskinen et al. | | |
| 2008/0035813 A1 * | 2/2008 | O'Keene et al. | ......... | 248/225.21 |

FOREIGN PATENT DOCUMENTS

| | | |
|---|---|---|
| CN | 2864914 | 1/2007 |
| CN | 2924251 | 7/2007 |
| DE | 20 2007 010 991 U1 | 11/2007 |
| JP | 09-249076 | 9/1997 |
| JP | 2000 347167 | 12/2000 |
| WO | WO 02/082178 | 10/2002 |

* cited by examiner

*Primary Examiner* — Lisa Lea Edmonds
*Assistant Examiner* — Xanthia C Cunningham
(74) *Attorney, Agent, or Firm* — Foley & Lardner LLP

(57) ABSTRACT

A mounting system for use in mounting products such as audio/visual devices to a surface such as a wall. According to various embodiments, one or more surface mounting structures are configured to attach to a surface such as a wall, while one or more device mounting structures are configured to attach to a device such as a flat panel display. Mating "touch" or "burr" fasteners on at least one surface mounting structure and at least one device mounting structure serve to inhibit the movement or rotation of these components relative to each other when the mounting system is in an assembled position.

17 Claims, 6 Drawing Sheets

DISPLAY MOUNTING SYSTEM

CROSS REFERENCE TO RELATED PATENT APPLICATIONS

The present application claims priority to U.S. Provisional Patent Application No. 61/041,826, filed Apr. 2, 2008 incorporated herein by reference in its entirety.

FIELD OF THE INVENTION

The present invention relates generally to mounting systems. More particularly, the present invention relates to mounting systems for audio/visual equipment such as flat panel displays.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display ("LCD") flat panel displays have continued to fall, and the quality for the same devices have improved, more and more businesses and individuals have purchased such devices for both home and business purposes.

One of the advantages of flat panel display devices that customers have found particular appealing is their relatively low thickness. Because conventional "tube" televisions have a relatively large depth, the placement options for such devices are quite limited. In the residential setting, most users require a television stand or large entertainment center to house the television. Such stands or entertainment centers can take up significant floor space, which is often undesirable. In the commercial or educational setting, users will often install large overhead mounting systems that can contain the television. However, these systems usually require professional installation and, once the television is secured to the mount, it is often difficult to access and adjust due to its height. With flat panel televisions, on the other hand, users are presented with a relatively new option: mounting the television directly to a mounting surface such as a wall. By mounting the television to the wall, the user can eliminate consumption of potentially valuable floor space.

Various systems have been developed for mounting flat panel displays to a wall or similar surface. A number of such systems comprised "fixed" mounting systems, in which the flat panel display when mounted, remains in substantially the same position unless the user at least partially disassembles the mounting system. Other mounting systems are adjustable in that a user can alter the orientation of the flat panel display relating to the mounting surface without at least partially disassembling the mounting system.

SUMMARY OF THE INVENTION

Various embodiments provide for an improved mounting system used to mount an audio/visual device, such as a flat panel display, to a mounting surface such as a wall. According to various embodiments, one or more surface mounting structures are configured to attach to a surface such as a wall, while one or more device mounting structures are configured to attach to a device such as a flat panel display. Mating "touch" or "burr" fasteners on at least one surface mounting structure and at least one device mounting structure serve to inhibit the movement or rotation of these components relative to each other when the mounting system is in an assembled position. For a particular combination of a surface mounting structure and a device mounting structure, a first portion is positioned on one of the structures, while a second portion is positioned on the other of the structures and is configured to mateably engage with the first portion. In various embodiments, the touch fasteners comprise hook and loop-style fasteners, although other types of touch fasteners may be used.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
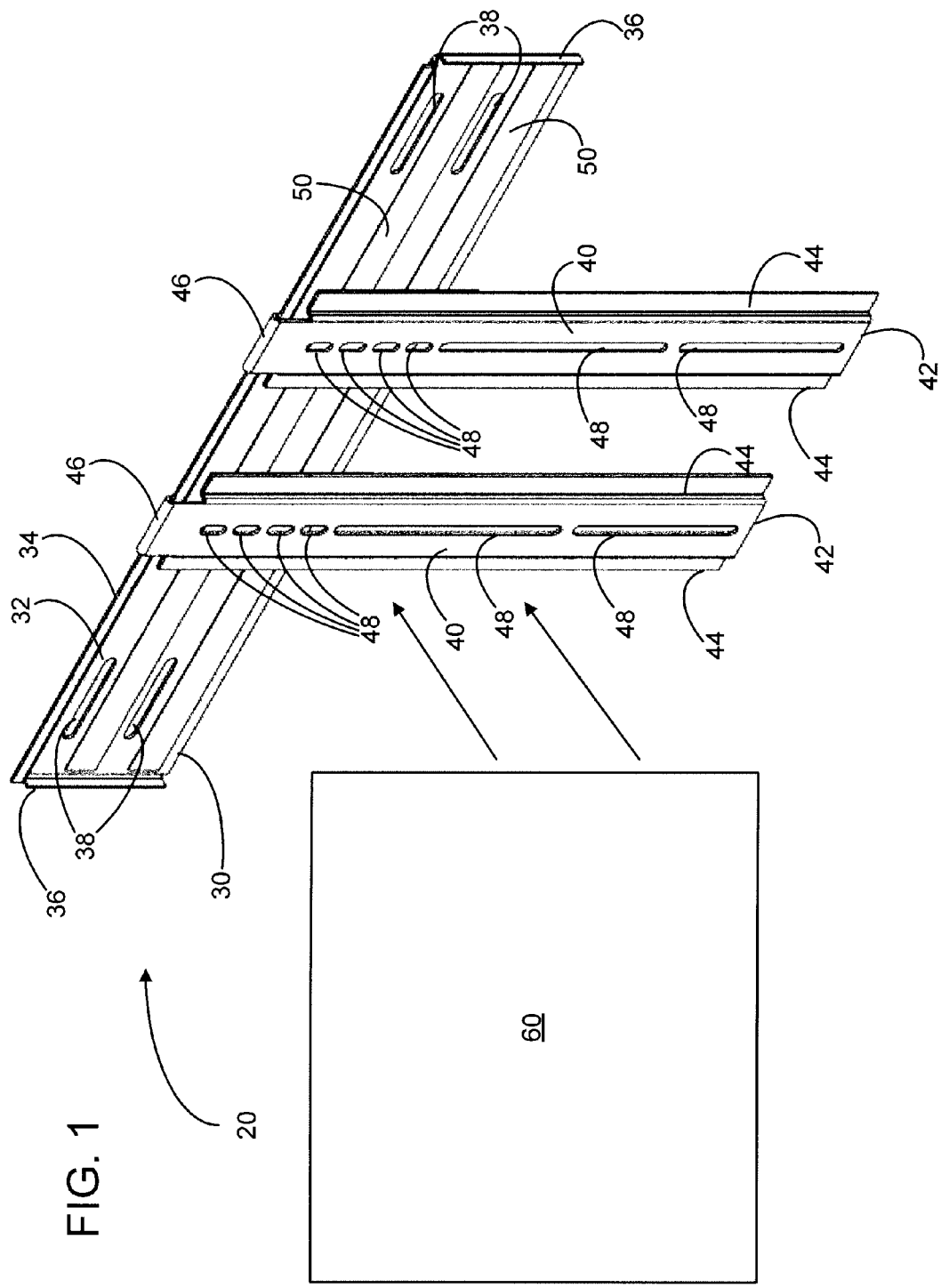
FIG. 1 is a perspective view of a display mounting system constructed according to various embodiments of the present invention.

Various embodiments provide for an improved mounting system used to mount an audio/visual device, such as a flat panel display, to a mounting surface such as a wall. FIG. 1 is a perspective view of an exemplary mounting system, showed generally at 20, constructed according to various embodiments of the present invention. The mounting system 20 depicted in FIG. 1 comprises at least one surface mounting structure 30 and a pair of device mounting structures 40. It should be noted, however, that is possible for the number of surface mounting structures 30 and device mounting structures 40 to vary.

Figure 2:
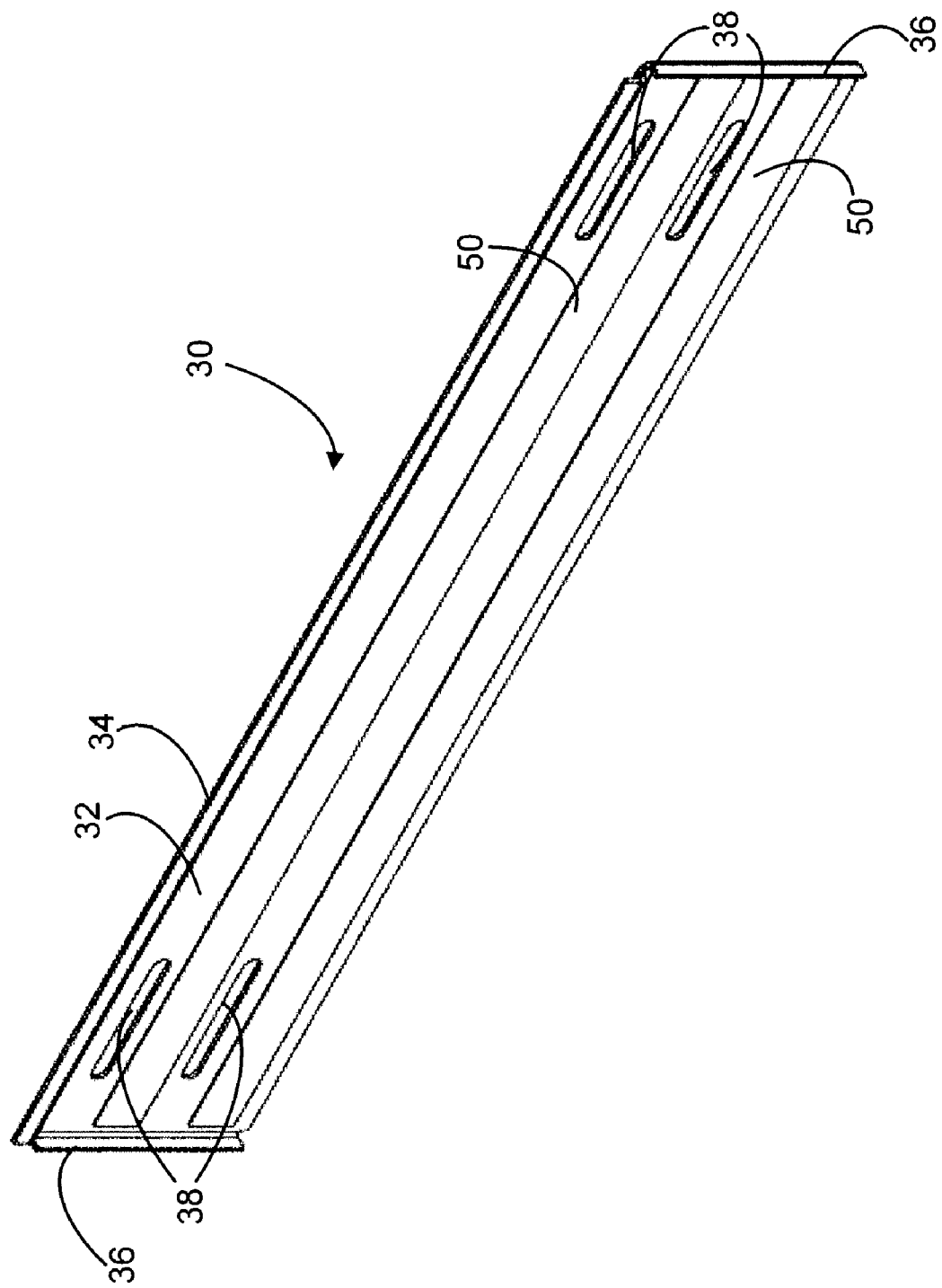
FIG. 2 is a perspective view of the surface mounting structure of the display mounting system of FIG. 1.

As shown in FIGS. 1 and 2, the surface mounting structure 30 includes a surface mounting interface 32 operatively connected to an upper ridge 34. In one particular embodiment, the surface mounting interface 32 and the upper ridge 34 are formed from a single piece of material, although it is also possible for these two components to be formed separately and then directly or indirectly coupled to each other. The surface mounting structure 30 may also include one or more side ridges 36, each of which may be formed separately or together with the surface mounting interface 32. The side ridges 36 aid in inhibiting the device mounting structures 40 from disengaging from the surface mounting structure 30 due to a strictly lateral movement. In particular, a lateral movement of a device mounting structure 40 will result in direct contact between the device mounting structure 40 and a side ridge 36 of the surface mounting structure.

The surface mounting structure 30 also includes one or more surface mounting openings 38 by which a user may secure the surface mounting structure 30 to a surface such as a wall. The surface mounting openings 38 may take the form of, for example, a plurality of slots and/or holes formed within the surface mounting interface 32. The surface mounting openings 38 are sized to accept one or more types of fasteners, such as screws, so that the surface mounting structure 30 may be secured to the mounting surface. In addition and/or instead of surface mounting openings 38, separate coupling devices (not shown) may be used to perform this function.

Figure 5:
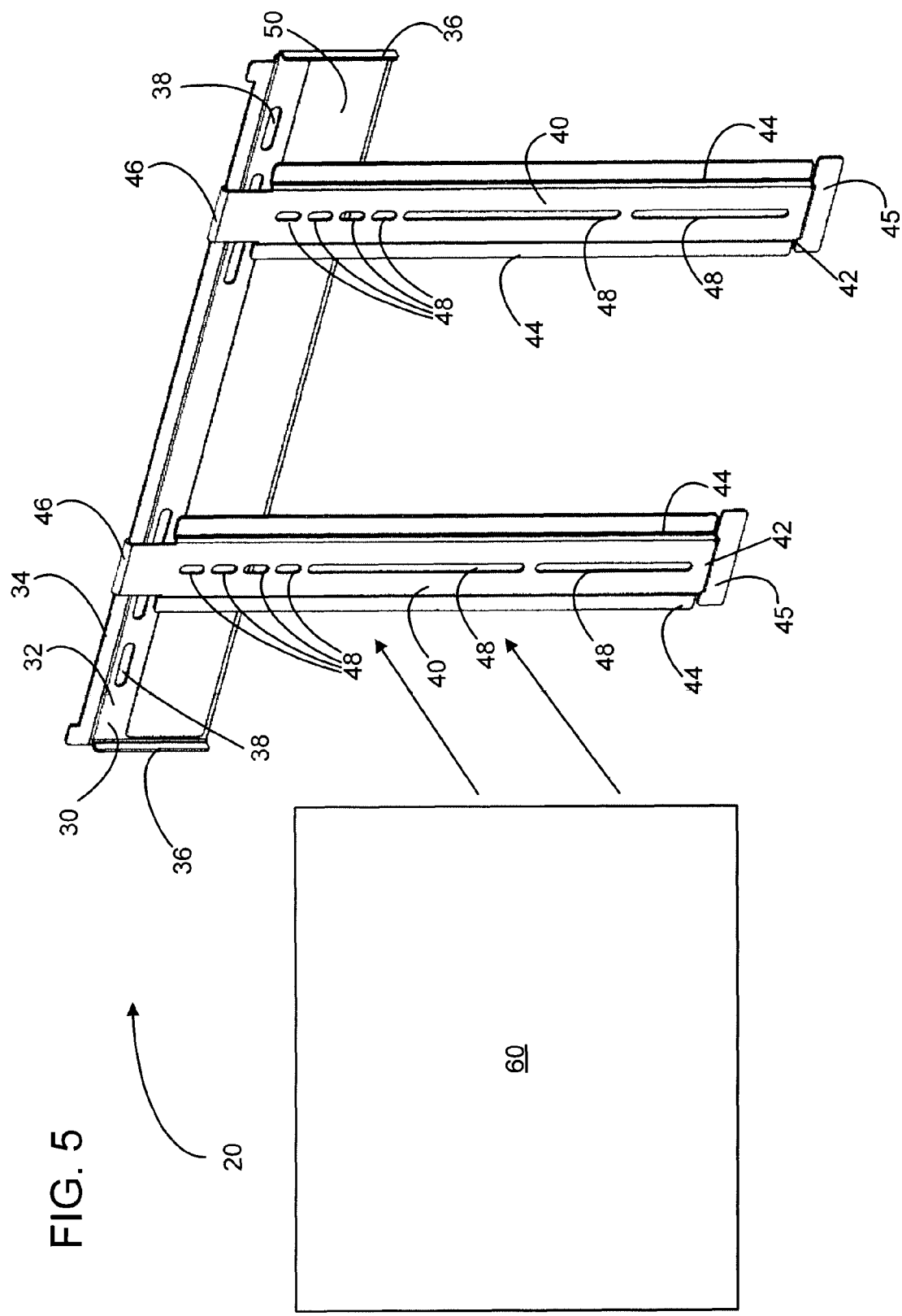
FIG. 5 is a perspective view of display mounting system constructed according to another embodiment of the present invention.
Figure 6:
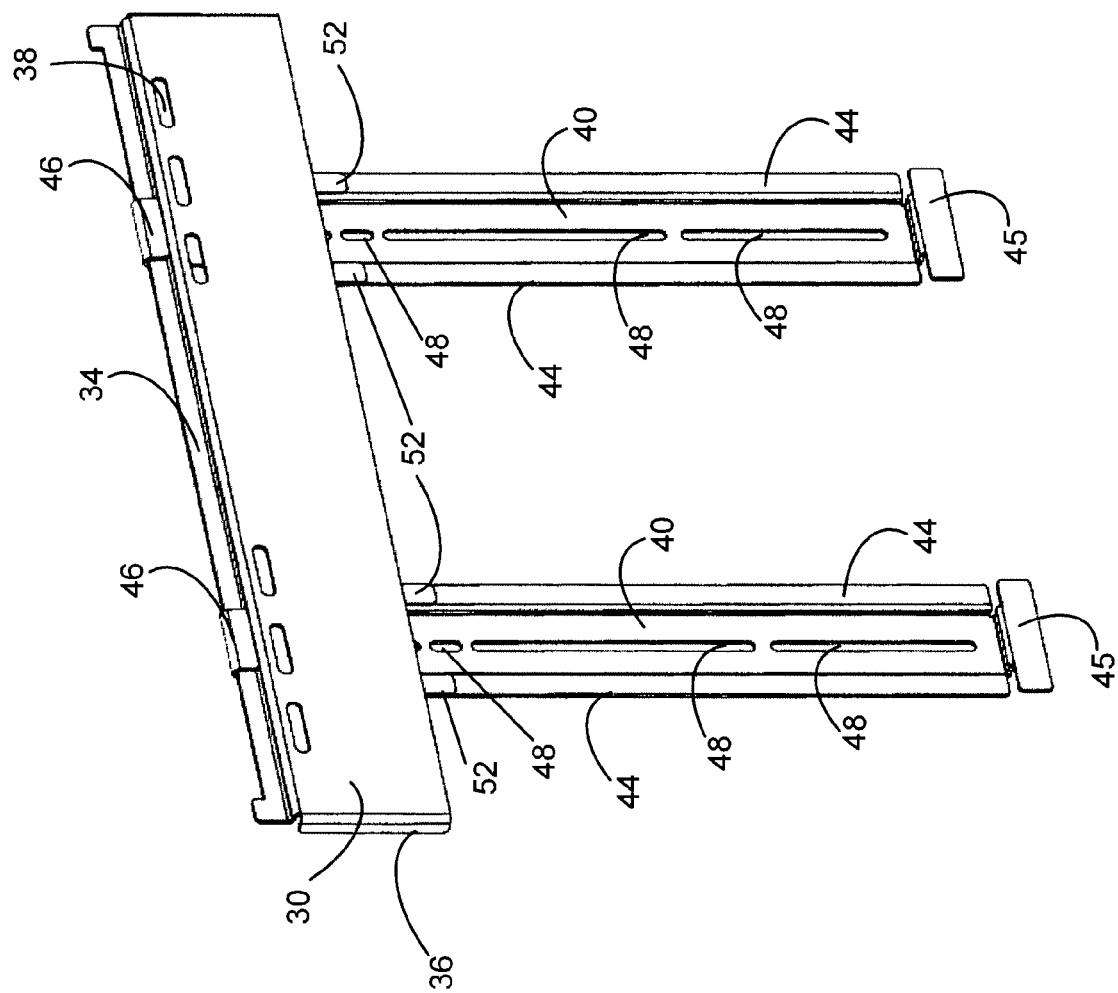
FIG. 6 is a reverse perspective view of display mounting system of FIG. 5.

The device mounting structure 40 includes a device mounting interface 42 operatively connected to at least one flange 44. In the embodiment shown in FIGS. 1 and 3, each device mounting structure 40 includes one flange 44 on each side of the device mounting interface 42. However, it should be understood that the precise number and arrangement of the flanges 44 may vary. As shown in FIG. 6, the device mounting structure 40 may also include a lower flange 45 extending toward the surface mounting structure 30. The lower flange 45 may be configured to extend to the mounting surface to maintain a flat panel display 60 substantially parallel to the mounting surface or at a tilt angle. As can be seen in FIGS. 1, 3, 5 and 6, an upper portion of each device mounting structure 40 includes a hook portion 46. The hook portion 46 is capable of mating with the upper ridge 34 of the surface mounting structure 30. Like the components of the surface mounting structure, the device mounting interface 42, the flanges 44, lower flange 45 and the upper ridge 34 may be formed from a single piece of material, or they may be formed from separate components which are directly or indirectly coupled to each other.

The device mounting structure 40 also includes one or more device mounting openings 48 by which a user may secure the surface mounting structure 30 to a surface such as a wall. Like the surface mounting openings 38, the device mounting openings 48 may take the form of, for example, a plurality of slots and/or holes formed within the device mounting interface 42. The device mounting openings 48 are sized to accept one or more types of fasteners, such as screws, so that the device mounting structure 40 may be secured to an object such as an audio/visual device and, more particularly to a flat panel display, generically represented at 60 in FIG. 1. In a particular embodiment, the device mounting openings 48 are configured-such that a wide variety of flat panel displays, including both Video Electronics Standards Association (VESA) and non-VESA designs, produced by several different manufacturers, can be coupled to the device mounting structure 40. In other embodiments, however, the device mounting openings 48 can be configured to accept only one or a few specific flat panel devices, i.e., to align with openings that are strategically placed on a specific device. In addition and/or instead of device mounting openings 48, separate coupling devices (not shown) may be used to perform this function.

As discussed above, the hook portion 46 of each device mounting structure 40 and the upper ridge 34 of the surface mounting structure 30 are used to attach each device mounting structure 40 to the surface mounting structure 30. In addition, "touch" or "burr" fasteners are also used to secure these components relative to each other. One common type of touch fastener is a hook and loop fastener, commonly referred to under the name "Velcro." Hook and loop fasteners typically comprise two layers. A first layer typically comprises a strip of fabric including a plurality of plastic hooks covering a surface thereof. A second layer also typically comprises a strip of fabric, with this strip of fabric including a plurality of loops on one side thereof. When the first and second layers are pressed together, the hooks "catch" on the loops, thereby holding the first and second layers together. When one pulls the first and second layers away from each other, the hooks and loops disengage from each other. Another type of touch fastener comprises a "mushroom-head" type fastener. One such mushroom-head type fastener is marketed by the 3M Corporation under the "Dual Lock" name.

Figure 3:
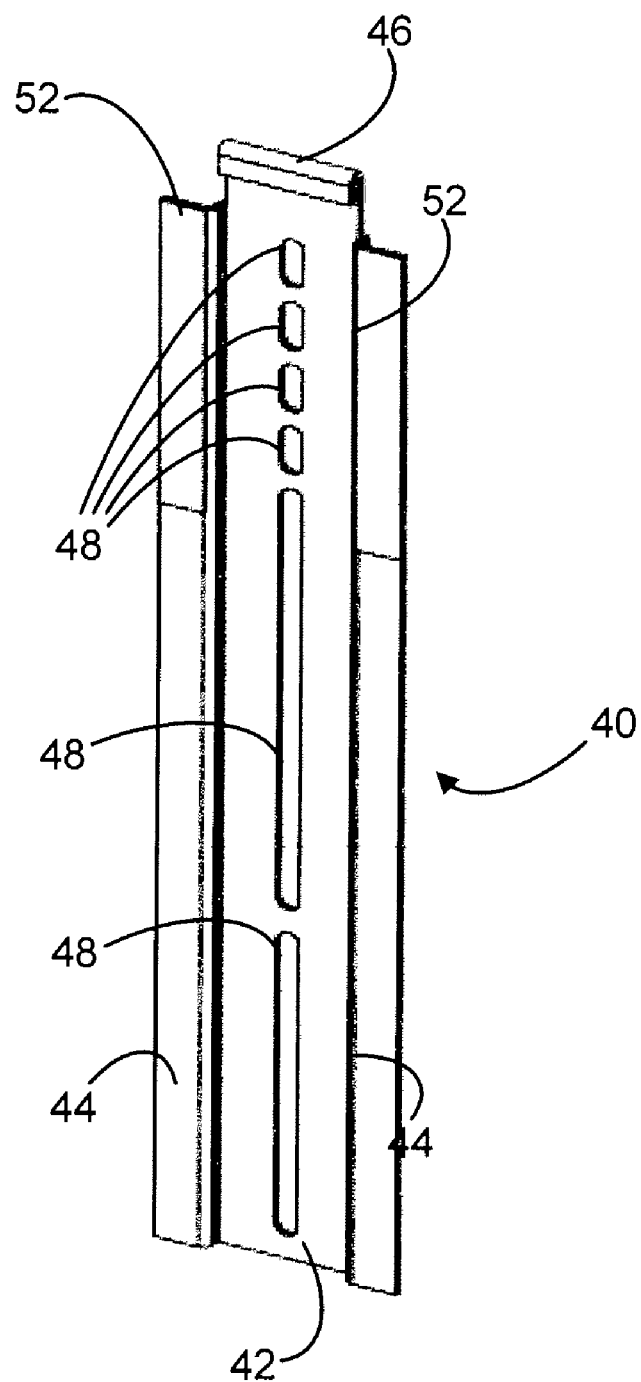
FIG. 3 is a reverse perspective view of a device mounting structure of the display mounting system of FIG. 1.

As shown in FIGS. 1-3, the surface mounting structure 30 includes at least one first fastener portion 50, while each device mounting structure 40 includes at least one second fastener portion 52. As shown in FIG. 5, the surface mounting structure 30 may include a single first fastener portion 50. When hook and loop-style fasteners are used, the first fastener portion 50 may comprise either a plurality of hooks thereon or a plurality of loops thereon. In this arrangement, the second fastener portion 52 may also comprise either a plurality of hooks thereon or a plurality of loops thereon. However, if hooks are on the first fastener portion 50, then loops must be on the second fastener portion 52 and vice versa.

As shown in FIGS. 1-3, the surface mounting structure 30 includes two first fastener portions 50, and each device mounting structure 40 includes two second fastener portions 52. However, the precise number of first fastener portions 50 and second fastener portions 52 may vary, for example, FIG. 5 shows a single first fastener potion 50 on the mounting structure 30. Additionally, the size and length of the first fastener portions 50 and second fastener portions 52 may also vary. However, the first fastener portions 50 and second fastener portions 52 are arranged so that they may selectively mate with each other. In the embodiment shown in FIGS. 1-3, for example, the first fastener portions 50 are positioned on the a side of the surface mounting interface 32 that does not contact the wall or other surface, while the second fastener portions 52 are positioned on a side of the device mounting interface 42 that does not contact the flat panel display 60 or other device. As such, when the hook portion 46 of each device mounting structure 40 has mated with the upper ridge 34 of the surface mounting structure 30, the first fastener portions 50 and the second fastener portions 52 come into contact with each other, further securing each device mounting structure 40 to the surface mounting structure 30.

When the first fastener portions 50 and the second fastener portions 52 are engaged with each other, they serve to counteract vertical, horizontal and rotational movements that may arise. This can be particularly useful, for example, in a situation where a person inadvertently bumps an attached flat panel device. Without the first and second fastener portions 50 and 52, it is possible that the hook portion 46 of a device mounting structure 40 will disengage from an upper ridge 34 of the surface mounting structure, which may lead to the flat panel device falling to the ground and causing potential damage and injury. With the first and second fastener portions 50 and 52, however, a sufficient counteracting force is imparted so as to prevent this from occurring due to truly inadvertent bumps and contacts. In contrast to using plastic or metal brackets, for example, the use of the first and second fastener portions 52 provides a simple and inexpensive system while still serving to inhibit potential vertical, horizontal and rotational movements. Furthermore, when a user wishes to intentionally disengage the device mounting brackets 40 from the surface mounting bracket 30, the user does not have to manipulate individual metal or plastic brackets behind the flat panel device. Instead, the user only needs to impart enough of a pulling force so as to engage the second fastener portions 52 from the first fastener portions 50, while also disengaging the hook portion 46 from the upper ridge 34.

Figure 4:
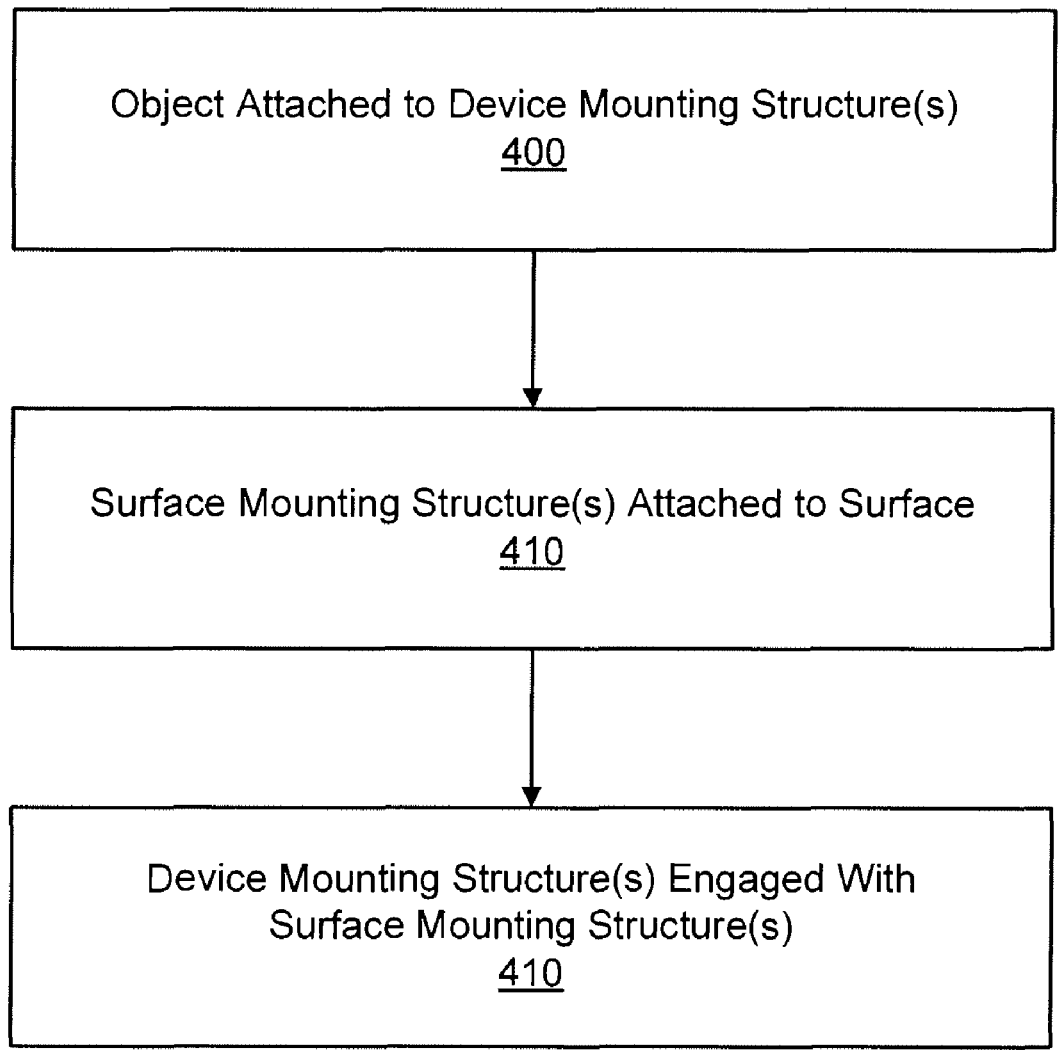
FIG. 4 is a flow chart depicting a process by which a display device may be securely positioned using the display mounting system of FIG. 1.

FIG. 4 is a flow chart showing a process by which a display device may be securely positioned using the display mounting system of FIG. 1. At 400 in FIG. 4, a user attaches an object, such as a flat panel display, to one or more device mounting structures 40. At 410, the user attaches a surface mounting structure 30 to a wall or similar support surface. It should be noted that 400 and 410 can also occur in the opposite order or substantially at the same time. The attachment processes in 400 and 410 may be accomplished, for example, by screwing the various mounting structures to the object or the support surface, respectively. At 420, the device mounting structures 40 are engaged with the surface mounting structure 30 so that the hook portion 46 engages the upper ridge 34 and the first and second fastener portions 50 and 52 engage each other.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. Various embodiments described herein are described in the general context of method steps or processes. The features of the embodiments described herein may be combined in all possible combinations of methods, apparatus, modules, systems, and computer program products.

What is claimed is:

1. A mounting assembly, comprising:
    a single surface mounting structure, including:
        a surface mounting interface configured to attach to a mounting surface,
        a first fastener portion operatively connected to the surface mounting interface, and
        an upper ridge operatively connected to the surface mounting interface; and
    first and second device mounting structures removably engageable with the single surface mounting structure, each of the first and second device mounting structures including:
        a device mounting interface configured to attach to an audio/visual device,
        a second fastener portion operatively connected to the device mounting interface, the second fastener portion positioned so as to engage the first fastener portion when the respective device mounting structure is engaged with the single surface mounting structure, thereby inhibiting the respective device mounting structure from vertical, horizontal and rotational movement relative to the single surface mounting structure, and
        a hook operatively connected to the display mounting interface,
    wherein the first fastener portion includes one of first and second mating touch fasteners, wherein the second fastener portion includes the other of the first and second mating touch fasteners, and wherein each hook engages the upper ridge when the first and second device mounting structures are engaged with the single surface mounting structure.

2. The mounting assembly of claim 1, wherein the first fastener portion comprises one of hook fasteners and loop fasteners, and wherein the second fastener portion comprises the other of hook fasteners and loop fasteners.

3. The mounting assembly of claim 1, wherein each device mounting interface includes:
    a device mounting interface first side configured to contact the audio/visual device; and
    a device mounting interface second side substantially opposite the device mounting interface first side,
    wherein the device mounting interface second side includes the second fastener portion attached thereto.

4. The mounting assembly of claim 1, wherein each surface mounting interface includes:
    a surface mounting interface first side configured to contact the mounting surface; and
    a surface mounting interface second side substantially opposite the surface mounting interface first side,
    wherein the surface mounting interface second side includes the first fastener portion attached thereto.

5. The mounting assembly of claim 1, wherein the audio/visual device comprises a flat panel display.

6. The mounting assembly of claim 1, wherein the engagement of the second fastener portion with the first fastener portion inhibits movement of the each device mounting structure relative to the single surface mounting structure in vertical, horizontal and rotational directions.

7. A mounting system, comprising:
    an audio/visual device;
    a single surface mounting structure, including:
        a surface mounting interface configured to attach to a mounting surface,
        a first fastener portion operatively connected to the surface mounting interface, and
        an upper ridge operatively connected to the surface mounting interface; and
    first and second device mounting structures removably engageable with the at least one surface mounting structure, each of the first and second device mounting structures including:
        a device mounting interface configured to attach to the audio/visual device,
        a second fastener portion operatively connected to the device mounting interface, the second fastener portion positioned so as to engage the first fastener portion when the respective device mounting structure is engaged with the at least one surface mounting structure, thereby inhibiting the respective device mounting structure from moving in at least one direction relative to the at least one surface mounting structure, and
        a hook operatively connected to the display mounting interface,
    wherein the first fastener portion includes one of first and second mating touch fasteners, wherein the second fastener portion includes the other of the first and second mating touch fasteners, and wherein each hook engages the upper ridge when the first and second device mounting structures are engaged with the surface mounting structure.

8. The mounting system of claim 7, wherein the first fastener portion comprises one of hook fasteners and loop fasteners, and wherein the second fastener portion comprises the other of hook fasteners and loop fasteners.

9. The mounting system of claim 7, wherein each device mounting interface includes:
- a device mounting interface first side configured to contact the audio/visual device; and
- a device mounting interface second side substantially opposite the device mounting interface first side,
- wherein the device mounting interface second side includes the second fastener portion attached thereto.

10. The mounting system of claim 7, wherein each surface mounting interface includes:
- a surface mounting interface first side configured to contact a surface; and
- a surface mounting interface second side substantially opposite the surface mounting interface first side,
- wherein the surface mounting interface second side includes the first fastener portion attached thereto.

11. The mounting system of claim 7, wherein the audio/visual device comprises a flat panel display.

12. The mounting system of claim 7, wherein the engagement of the second fastener portion with the first fastener portion inhibits movement of the each device mounting structure relative to the single surface mounting structure in vertical, horizontal and rotational directions.

13. A method of mounting an audio/visual device, comprising:
- attaching a single surface mounting structure to a surface, the single surface mounting structure including:
  - a surface mounting interface configured to attach to a mounting surface,
  - a first fastener portion operatively connected to the surface mounting interface, and
  - an upper ridge operatively connected to the surface mounting interface;
- attaching first and second device mounting structures to the audio/visual device, each of the first and second device mounting structures including:
  - a device mounting interface configured to attach to an audio/visual device, and
  - a second fastener portion operatively connected to the device mounting interface; and
- engaging the first and second device mounting structures to the single surface mounting structure, causing each second fastener portion to engage the first fastener portion and thereby inhibiting each respective device mounting structure from vertical, horizontal and rotational movement relative to the single surface mounting structure,
- wherein the first fastener portion includes one of first and second mating touch fasteners, and wherein the second fastener portion includes the other of the first and second mating touch fasteners.

14. The method of claim 13, wherein the first fastener portion comprises one of hook fasteners and loop fasteners, and wherein the second fastener portion comprises the other of hook fasteners and loop fasteners.

15. The method of claim 13, wherein each device mounting interface includes:
- a device mounting interface first side configured to contact the audio/visual device; and
- a device mounting interface second side substantially opposite the device mounting interface first side, and wherein the device mounting interface second side includes the second fastener portion attached thereto.

16. The method of claim 13, wherein each surface mounting interface includes:
- a surface mounting interface first side configured to contact the mounting surface; and
- a surface mounting interface second side substantially opposite the surface mounting interface first side, and wherein the surface mounting interface second side includes the first fastener portion attached thereto.

17. The method of claim 13, wherein the engagement of each second fastener portion with the first fastener portion inhibits movement of each device mounting structure relative to the single surface mounting structure in vertical, horizontal and rotational directions.

\* \* \* \* \*